US006628338B1

(12) United States Patent
Elberbaum et al.

(10) Patent No.: US 6,628,338 B1
(45) Date of Patent: Sep. 30, 2003

(54) DIRECT DRIVE ELECTRIC MOTOR APPARATUS INCORPORATING SLIP RING ASSEMBLY

(75) Inventors: David Elberbaum, Tokyo (JP); Masafumi Sakamoto, Kiryu (JP)

(73) Assignee: Elbex Video Ltd., Tokyo (JP)

( * ) Notice: Subject to any disclaimer, the term of this patent is extended or adjusted under 35 U.S.C. 154(b) by 0 days.

(21) Appl. No.: 09/112,120

(22) Filed: Jul. 8, 1998

(51) Int. Cl.[7] .......... H04N 5/225
(52) U.S. Cl. .......... 348/373
(58) Field of Search .......... 348/373, 374, 348/375, 357, 24.99, 143, 151; 396/427, 428, 419; 310/75 R, 80, 83; 74/640, 5.47; 475/149, 2, 4, 5, 6

(56) References Cited

U.S. PATENT DOCUMENTS 3,638,502 A * 2/1972 Leavitt et al. .......... 348/211.99
3,986,412 A * 10/1976 Farley .......... 475/5
4,890,713 A * 1/1990 Pagano .......... 348/373
5,028,997 A * 7/1991 Elberbaum .......... 348/143
5,111,288 A * 5/1992 Blackshear .......... 348/373
5,293,107 A * 3/1994 Akeel .......... 310/83
5,394,209 A * 2/1995 Stiepel et al. .......... 348/151
5,627,616 A * 5/1997 Sergeant et al. .......... 348/143
5,751,078 A * 5/1998 Loewenthal .......... 310/80
5,923,364 A * 7/1999 Rhodes et al. .......... 348/211.99
6,477,918 B2 * 11/2002 Sakamoto .......... 74/640

* cited by examiner

*Primary Examiner*—Aung S. Moe
(74) *Attorney, Agent, or Firm*—Katten Muchin Zavis Rosenman

(57) ABSTRACT

An electric motor apparatus in a direct drive positioning device for positioning for example a television camera or a robot arm along X-Y-Z axes, which provides a direct drive which permits a free and unobstructed continuous rotation over 300° in horizontal, vertical and any other angular axes with no electrical wires or cables twisting or flexing. The apparatus includes a motor which has a hollow central shaft connected to a rotary member for mounting thereon a robot arm or television camera of the direct drive positioning device. The central shaft encloses a rotating slip ring assembly coupled to respective wires for connecting to the television camera. Electric power is supplied through the wires which are not twisted or flexed while the rotating member is being directly driven by the motor and is rotating.

50 Claims, 5 Drawing Sheets

DIRECT DRIVE ELECTRIC MOTOR APPARATUS INCORPORATING SLIP RING ASSEMBLY

BACKGROUND OF THE INVENTION

1. Field of the Invention

This invention relates to an electric motor apparatus used for positioning a device such as robot arm along X-Y-Z axes, and more particularly, for a positioning device used for a television camera.

2. Description of the Prior Art

Positioning devices such as pan-tilt heads for television cameras or robot arms include a fixed body to be attached to a wall, a pole or a table and employs motors and power transmission assemblies consisting of gears or rollers or belts and pulleys or chains, and the like. Such pan-tilt heads or robot arm mechanisms are generally constructed so that the television cameras or the robot arm rotate angularly about their vertical and horizontal and/or other angular axes. In some cases electrical wires or a cable assembly are used for connecting the rotating television camera or the robot arm circuits to the fixed base of the positioning device. Such electrical wires or a cable are commonly known as a flexible cable assembly that spans between the fixed and the rotatable members, or between two rotatable members of the positioning device. The cable assembly thereby rotates and repeatedly twists or flexes along with the movement of the positioning device, and this eventually causes the cable to break. This requires a frequent cable replacement which is costly; moreover such cable assembly spanning across a joint of the positioning device prevents the positioning device from rotating over 360° about its axis, which limits the free rotation of the positioning device.

Some positioning devices use slip-ring or rotating contact assemblies which are positioned at the individual rotating axis center, thereby eliminating the cable assemblies from spanning across the rotating joints. However, such slip ring assembly occupies the center of the rotating axis, thereby preventing the use of a direct drive motor, such as stepping motors, which are very efficient, accurate and require no power transmission mechanism.

SUMMARY OF THE INVENTION

It is an object of the present invention to provide a direct drive positioning device with a direct drive motor and a slip-ring mechanism mounted inside or along a main shaft of the motor. When such direct drive motor is positioned with its shaft at each axis, it permits a free unobstructed and continuous rotation, over 360° in both horizontal and. vertical axes and/or other angular axes, with no cables twisting or flexing.

According to the present invention a direct drive positioning device comprises at least one rotating member for rotating about horizontal or vertical or any other angular axes of the positioning device. Each such rotating member is provided with means to mount a television camera or a robot arm and/or for mounting another member for incorporating a further joint positioning mechanism.

A direct drive motor has its central shaft connected to a rotating member for directly driving the rotating member wherein its central shaft comprises a rotating or slip ring assembly. The rotating contacts or the slip ring assembly provides for connecting the television camera, or the robot arm circuits and/or the direct drive motor circuit to a control circuit and other peripheral/ancillary equipment, thereby eliminating the problems associated with the use of flexing cables and providing for a continuous uninterrupted rotation about the rotating axis over 360°.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Figure 1:
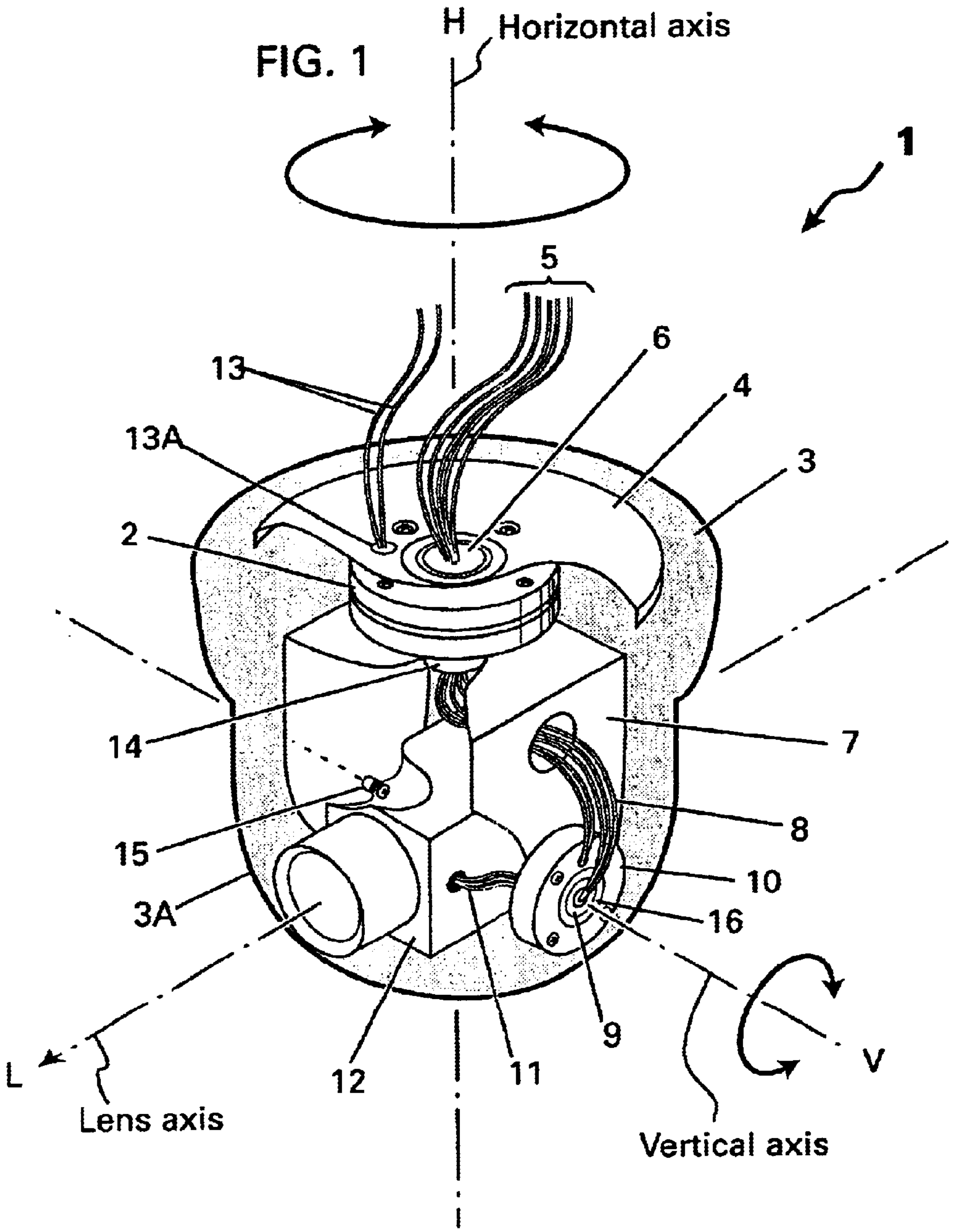
FIG. 1 is a perspective view of a television camera inside a domed cover incorporating direct drive motors of the preferred embodiment.

A television camera apparatus 1 shown in FIG. 1 is a well known dome-shaped camera enclosure 3 used in surveillance systems comprising a portion having transparent or semi-transparent dome 3A, a base plate 4 which is fixedly attached to the upper portion of the camera enclosure 3, a panning motor 2 which is fixedly attached to the surface of the base plate 4, a camera holder bracket 7 attached to a rotor 14 of the panning motor 2 to be rotatable about horizontal axis H (pan) extending through the center of the base plate 4 and orthogonal to the base plate 4.

A tilting motor 10 is fixedly mounted onto one side of the camera holder bracket 7 which is formed as an inverted U-shape fork-like holder. A television camera 12 is attached to a rotor 16 of the tilting motor 10, so that the camera can be rotatable about the vertical axis-V (tilt), while on the opposite side the camera is mounted to the camera holder bracket 7 via a well known pivoted rotating joint 15 extended along the V axis.

The V axis (tilt) which is orthogonal to the H axis (pan) along with the L axis (lens) which is orthogonal to the V axis (tilt) and the H axis (pan) all intersect at the center core of the dome shaped cover portion 3A so as to provide for the all-round unobstructed panning and tilting movement within the dome sphere. The panning motor 2 incorporates rotary contacts or a slip ring assembly 6 inside its rotor 14 shown also in FIGS. 4 & 5. The slip ring assembly 6 per se is a well known assembly of rotating conductive metal rings along with complementary mounted conductive metal brushes that provide pressure for a continuous current flow through the metal rings during the rotation of the metal rings.

Connecting wires 5 including wires for feeding power and control signals to the camera and a video signal, an audio signal and data signals from the camera pass through an opening in the domed closure or case 3 and the base plate 4 for connecting the rotating ring of the slip ring assembly 6. Wires 13 feeding power to the panning motor 2 may be fed through a separate opening 13A directly to the panning motor if the panning motor 2 is an inner rotor type or should be connected along with the connecting wires 5 if the panning motor 2 is an outer rotor type.

Wires 8 connected at one ends to the brushes of the slip ring assembly 6 are fed through an opening in the holder bracket 7 and are connected at their other ends to the rotating rings of a slip ring assembly 9 mounted inside the shaft of the rotor 16 of the tilting motor 10.

Wires 11 connected to the brushes of the slip ring assembly 9 are further connected at the other ends to the camera 12 and to control circuits (not shown). It is obvious from FIG. 1 that in this arrangement the camera can rotate endlessly about its panning H axis or its tilting V axis without causing the wires to flex or twist. Furthermore, it is obvious that the camera holder bracket 7 which is mounted directly onto the rotor 14 of the panning motor 2 is directly driven by the drive motor without any power transmission mechanism. Similarly, it is obvious from FIG. 1 that the rotor 16 of the tilting motor 10 can drive the camera tilting position directly, using no power transmission mechanism.

The elimination of power transmission devices and assemblies reduces the size of the dome-shaped camera enclosure 3, simplifies the construction and improves upon the efficiency and the accuracy of the positioning device, as well as improves its reliability.

Figure 2:
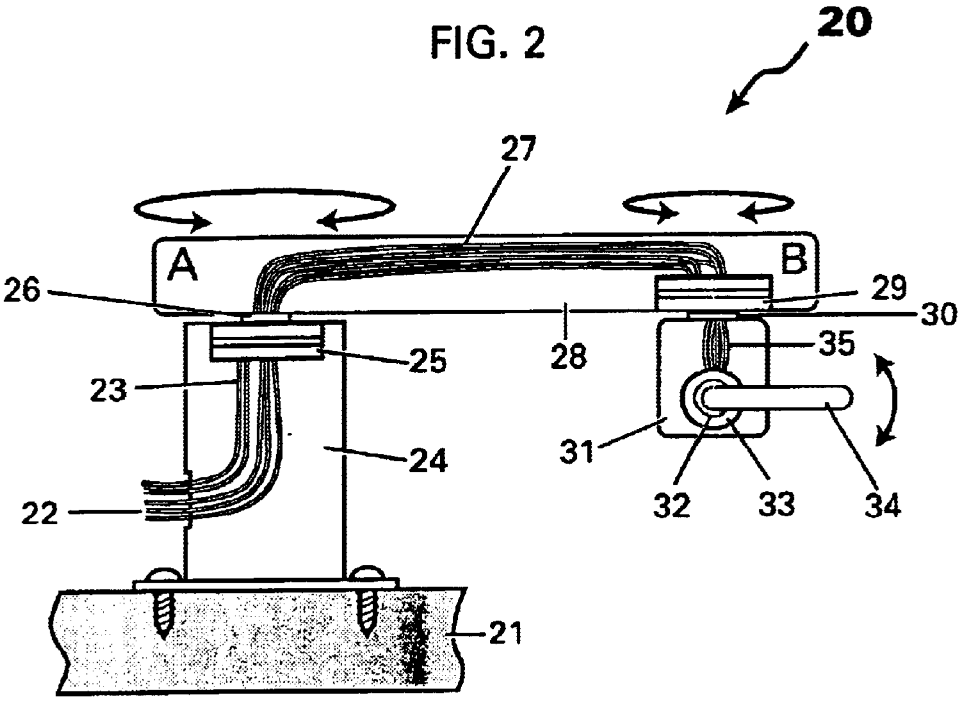
FIG. 2 is a schematic side view of a robot arm incorporating direct drive motors of the preferred embodiment of the invention.

A robot arm 20 shown in FIG. 2 has a fixed body 24 attached to a table 21. A motor 25 affixed to the upper surface of the fixed body 24 incorporates a rotary contact or slip ring assembly inside its rotor shaft 26 and the rotor is affixed to one end of a horizontally rotating arm 28 of the robot arm 20. The control and power wires 22 are directly connected to the slip rings of the slip ring assembly inside the rotor shaft 26 (not shown) while power to the motor 25 can be fed directly through wires 23 since the motor 25 is an inner rotor type.

Wires 27 are connected at the side A of the horizontally rotating arm 28 to the brushes of the slip ring assembly (not shown) mounted inside the rotor shaft 26 and at the side B of the horizontally rotating arm 28 to the rings of a slip ring assembly (not shown) inside the rotor shaft 30 of a motor 29 and to the motor 29. The motor 29 is affixed to the end B of the horizontally rotating arm 28 and the rotor shaft 30 is affixed to an horizontally rotating joint 31.

Wires 35 are connected at one ends thereof to the brushes of the slip ring assembly positioned inside the rotor 30 while the other ends of wires 35 are connected to the rings of a slip ring assembly incorporated inside the shaft of the rotor 32 of the motor 33. The brushes of the slip ring assembly inside the rotor 32 are connected by wires (not shown) to a robot arm finger 34 and its circuitry. It is obvious from FIG. 2 that the horizontally rotating arm 28, the horizontally rotating joint 31 and the vertically rotating finger 34 can all rotate endlessly without flexing or twisting any of the wires connecting power and/or control signals to the respective motors and control circuits. It is also obvious that the construction of the robot arm is greatly simplified by the use of direct drive motors incorporating slip ring assemblies inside the rotor shafts.

Figure 3:
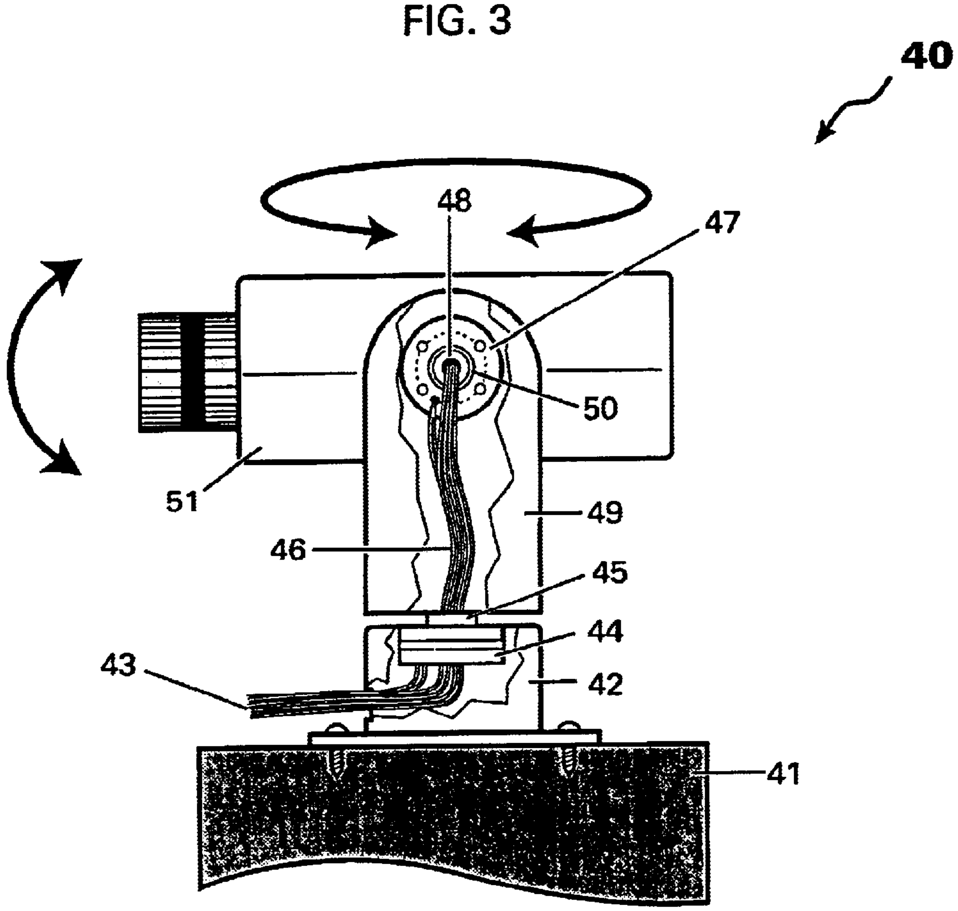
FIG. 3 is a schematic side view of a television camera mounted onto a remote positioning device incorporating direct drive motors of the preferred embodiments of the present invention.

A television camera apparatus 40 shown in FIG. 3 is another well known television camera 51 mounted on a well known pan-tilt positioning device consisting of a fixed member 42 and a horizontally rotating member 49. The fixed number 42 is affixed to the top of a wall 41 and comprises a motor 44 which is attached to the top of the fixed member 42 while a rotor 45 is affixed to the horizontally rotating member 49. Wires 43 are connected to the rings of the slip ring assembly located inside the shaft of the rotor 45 and to the motor 44. A motor 47 is affixed to the arm of the horizontally rotating member 49 and a rotor 50 is affixed to the camera 51. Wires 46 are connected at one ends thereof to the brushes of the slip ring assembly inside the shaft of the rotor 45 and at the other ends thereof to a ring of the slip ring assembly 48 inside the shaft of rotor 50.

The wires connected to the brushes of the slip ring assembly 48 (not shown) feed power and control signals to the camera 51 and video/audio signals from the camera. It is apparent from FIG. 3 that the pan-tilt positioning device of the camera apparatus 40 can endlessly rotate in any horizontal and vertical direction without flexing or twisting a plurality of wires carrying power, control and video signals. It is also apparent that such positioning device employing direct drive motors with built-in slip rings inside the rotor's shafts provide a simplified mechanical construction.

Figure 4:
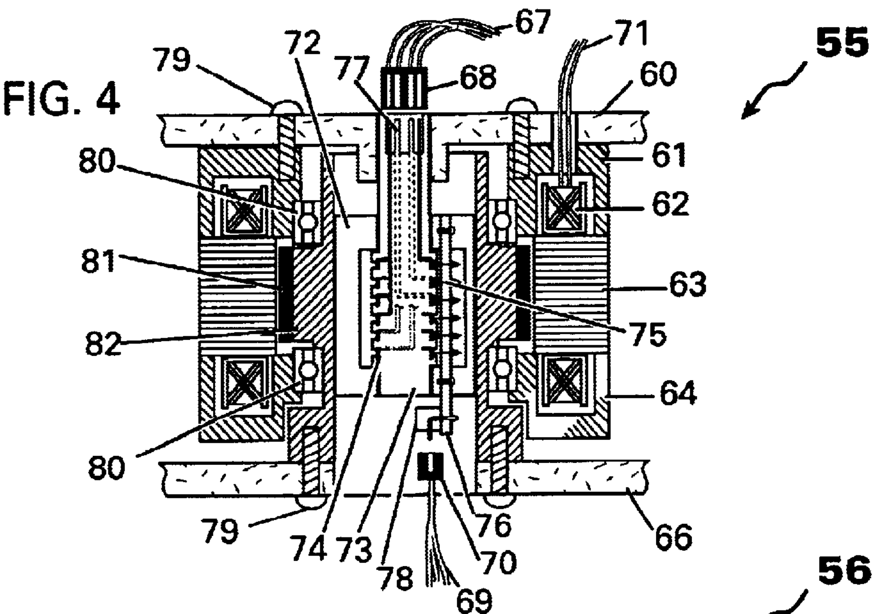
FIG. 4 is an axial sectional view of a stepping motor incorporating a slip ring assembly of the preferred embodiment of the invention.

A motor assembly 55 shown in FIG. 4 combines a well known stepping motor with an inner rotor and rotating contacts or a slip ring assembly. A plate 60 is a portion of a fixed or a rotating joint of a positioning device such as the base plate 4 of FIG. 1. The plate 60 is affixed to a first cover 61 of the stator portion of the motor assembly 55 using a plurality of screws 79.

The stator portion of the motor assembly 55 includes a stator coil assembly 62, magnetic metal laminates 63, first cover 61 and a second cover 64. The stator coil assembly 62 is connected to power and control circuits (not shown) via wires 71 passing through an opening in the first cover 61 and plate 60.

Dual ball bearings 80 are provided for supporting the rotor assembly between the first cover 61 and second cover 64 to ensure a smooth rotor movement.

A rotor assembly includes a hollow rotor shaft 82 surrounded by a magnetic ring 81 and a slip ring assembly embedded inside the rotor shaft.

The rotor shaft 82 is attached to a plate 66 by a plurality of screws 79. The plate 66 is a portion of a fixed member or of a rotating joint of a positioning device such as the camera holder bracket 7 shown in FIG. 1.

A well known slip ring assembly has the rings holder assembly 73 which rotate inside a slip ring body 72 and a printed circuit board assembly 76. A ring holder assembly 73 includes multiple conductive rings 74 all spaced and insulated from each other and all electrically connected to a connector 77.

The printed circuit board assembly 76 is fixedly attached to the slip ring body 72 and comprises multiple conductive electrical brushes 75 positioned and spaced to compliment the multiple conductive rings 74 for providing a constant electrical contact by their brushing action against the conductive rings 74 and a connector 78 for providing electrical connections to the wire assembly 69.

The slip ring body 72 is fixedly attached to the rotor shaft 82 and the ring holder assembly 73 which rotates about the central axis of the slip ring body 72 is fixedly attached to plate 60.

The wire harness or assembly 67 and connector 68 provide electrical connections to a plurality of the conductive rings 74 while the wire assembly 69 and the connector 70 provide complimentary electrical connections to the conductive electrical brushes 75.

It becomes obvious from FIG. 4 that the wires of the wire assembly 67 and wire assembly 69 are electrically connected through the conductive rings 74 and the conductive electrical brushes 75 regardless of whether the motor is idle or it is energized through its power and control wires 71 and is rotating.

Figure 5:
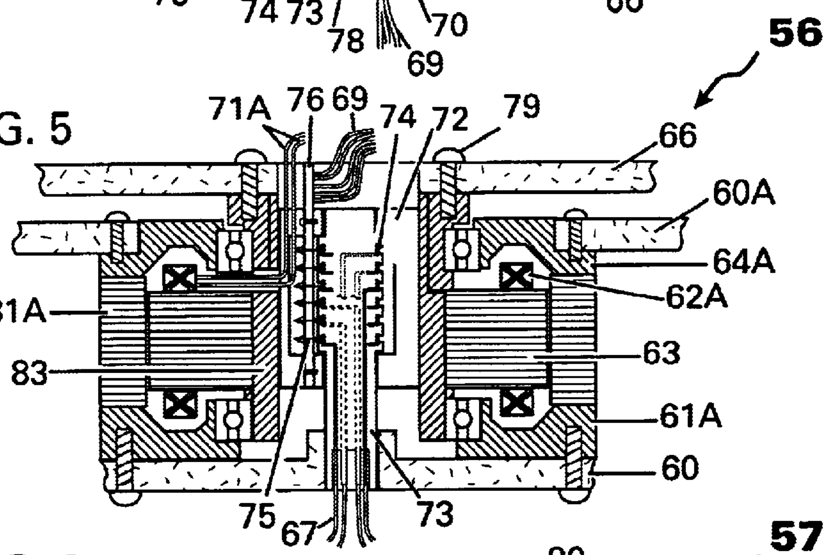
FIG. 5 is an axial sectional view of another stepping motor incorporating a slip ring of a preferred embodiment of the present invention.

A motor assembly 56 of FIG. 5 combines a well known stepping motor with the outer rotor and rotating contacts or slip ring assembly. A plate 60 similarly to the plate 60 of FIG. 4 is affixed to the first cover 61A of the outer rotor portion of the motor assembly 56, using screws 79. The outer rotor portion of the motor assembly 56 consists of magnetic metal laminates 81A, first cover 61A and second cover 64A.

Dual ball bearings 80 are provided between a stator shaft 83, first cover 61A and second cover 64A for supporting the rotor and to ensure a smooth rotor rotation. A stator assembly includes the hollow stator shaft 83 surrounded by and fixedly attached to magnetic metal laminates 63, a stator coil assembly 62A and a slip ring assembly embedded inside the stator shaft. The stator coil assembly 62A is connected to power and control circuits (not shown) via wires 71A passing through an opening in the stator shaft 83 and a plate 66.

The stator shaft 83 is attached to the plate 66 by a plurality of screws 79. Plate 66 is a portion of a fixed member or of a rotating joint of a positioning device such as the camera holder bracket 7 shown in FIG. 1.

A well known slip ring assembly includes a ring holder assembly 73 rotating inside the slip ring body 72 and a printed circuit board assembly 76. The ring holder assembly 73 consists of multiple conductive rings 74 all spaced and insulated from each other and all electrically connected via a wire harness 67.

The printed circuit board assembly 76 includes multiple conductive electrical brushes 75 positioned and spaced to compliment the multiple conductive rings 74 for providing constant electrical contact by their brushing action against the conductive rings 74 and a wire harness 69 for providing electrical connections.

The slip ring body 72 is fixedly attached to the stator shaft 83 and the ring holder assembly 73 which rotates about the central axis of the slip ring body 72 is fixedly attached to plate 60.

The wire harness 67 provides electrical connections to the plurality of the conductive rings 74 while the wire harness 69 provides the complimentary electrical connections to the plurality of the conductive electrical brushes 75.

It becomes obvious from FIG. 4 that the wire harness 67 and the wire harness 69 are electrically connected through the conductive rings 74 and the conductive electrical brushes 75 regardless of whether the motor is idle or it is energized through its power and control wires 71 and is rotating.

Instead of attaching the plate 60 of FIG. 5 to the first cover 61A it is possible to attach plate 60A to the second cover 64A, thereby providing for mounting the motor assembly 56 to a positioning device such as motor 25 or motor 29 of FIG. 2 or motor 42 of FIG. 3 the same why as they are shown to be mounted to the respective members of the positioning devices. Similarly, it will be possible to mount the motor assembly 55 shown in FIG. 4 to a member of the positioning device by affixing the second cover 64 of FIG. 4 to the member of the positioning device instead of the plate 60 attached to first cover 61 of motor assembly 55 shown in FIG. 4.

It is apparent from FIG. 4 and FIG. 5 that regardless of whether the motor is an inner or an outer rotor type it can incorporate the slip ring assembly inside its main shaft and provide a through passage for power, control and other signals without flexing or twisting the wires connected to the opposing sides of the rotating joint and such motor assembly can endlessly rotate about its rotating axis.

The motor assemblies 55 and 56 shown in FIG. 4 and FIG. 5 are large diameter type motors which can be made with a shaft diameter large enough to incorporate the slip ring assembly inside the shaft. On occasions there may be a need for slim motors which cannot be provided with the slip ring assembly inside a small diameter shaft. For such motors it is possible to provide a hollow shaft and mount the slip ring assembly at the end of the shaft.

Figure 6:
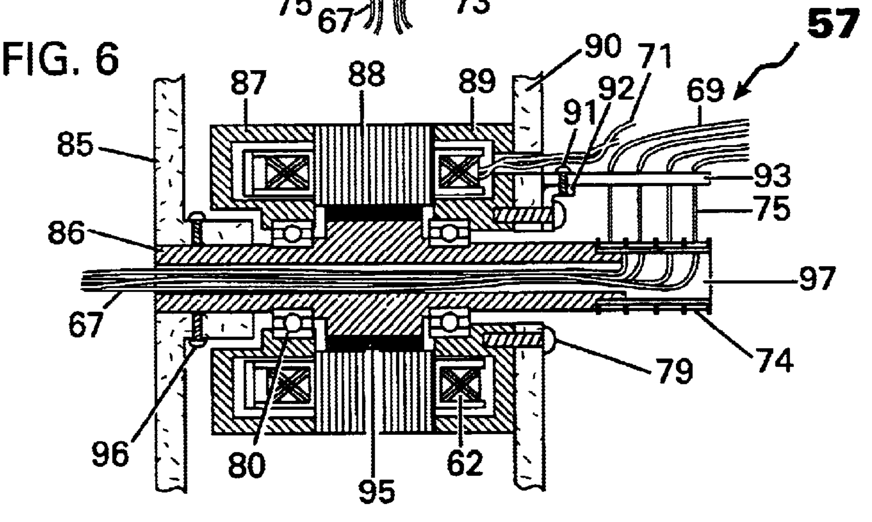
FIG. 6 is an axial sectional view of yet another motor incorporating a slip ring assembly of still another preferred embodiment.

A motor assembly 57 shown in FIG. 6 combines a well known stepping motor with the inner rotor and rotating contacts or a slip ring assembly. A plate 90 is a portion of a fixed joint or of a rotating joint of a positioning device; the plate 90 is affixed to the first cover 89 of the stator portion of the motor assembly 57 using screws 79.

The stator portion of the motor assembly 57 consists of a coil assembly 62, magnetic metal laminates 88, a first cover 89 and a second cover 87. The stator coil assembly 62 is connected to power and control circuits (not shown) via wires 71 passing through an opening in the first cover 89 and plate 90.

Dual ball bearings 80 are provided for supporting the rotor assembly between the first cover 89 and second cover 87 to ensure the smooth rotor movement. The rotor assembly comprises a hollow rotor shaft 86 surrounded by a magnetic ring 95 and a ring holder assembly 97 mounted at one end of the rotor shaft.

The other end of the rotor shaft 86 is attached to a plate 85 by screws 96. The plate 85 is a portion of a fixed member or of a rotating joint of a positioning device (not shown).

The slip ring assembly includes the ring holder assembly 97 attached to the rotor shaft 86 and a printed circuit board assembly 93 affixed to plate 90. The ring holder assembly 97 includes multiple conductive rings 74 all spaced and insulated from each other and all electrically connected to the wire harness 67. All the wires of wire harness 67 are fed through the hollow rotor shaft 86 and through the opening in the plate 85 to exit from the other end of the rotor shaft, opposite to the end of the ring holder assembly 97.

The printed circuit board assembly 93 is fixedly attached to the plate 90 and/or to the first cover 90 by a holder 92 and screws 91 and comprises multiple conductive electrical brushes 75 positioned and spaced to compliment multiple conductive rings 74 for providing constant electrical contact by their brushing action against the conductive rings 74 and wire harness 69 for providing electrical connections.

The ring holder assembly 97 is fixedly attached to the rotor shaft 86 for rotating about the central axis of the shaft 86.

The wire harness 67 provides electrical connections to the plurality of the conductive rings 74 while the wire harness 69 provides the complimentary electrical connections to the plurality of the conductive electrical brushes 75.

It becomes obvious from FIG. 6 that the wires of the wire harness 67 and the wire harness 69 are electrically connected through the conductive rings 74 and the conductive electrical brushes 75 regardless of whether the motor is idle or it is energized through its power and control wires 71 and is rotating.

It is also obvious from FIG. 6 that it is possible to mount a slip ring assembly to the shaft of the motor of a positioning device even though the motor is slim, to thereby provide a through passage for power, control or other signals without flexing or twisting the wires connected to the opposing sides of the rotating joint.

Figures 7A, 7B:
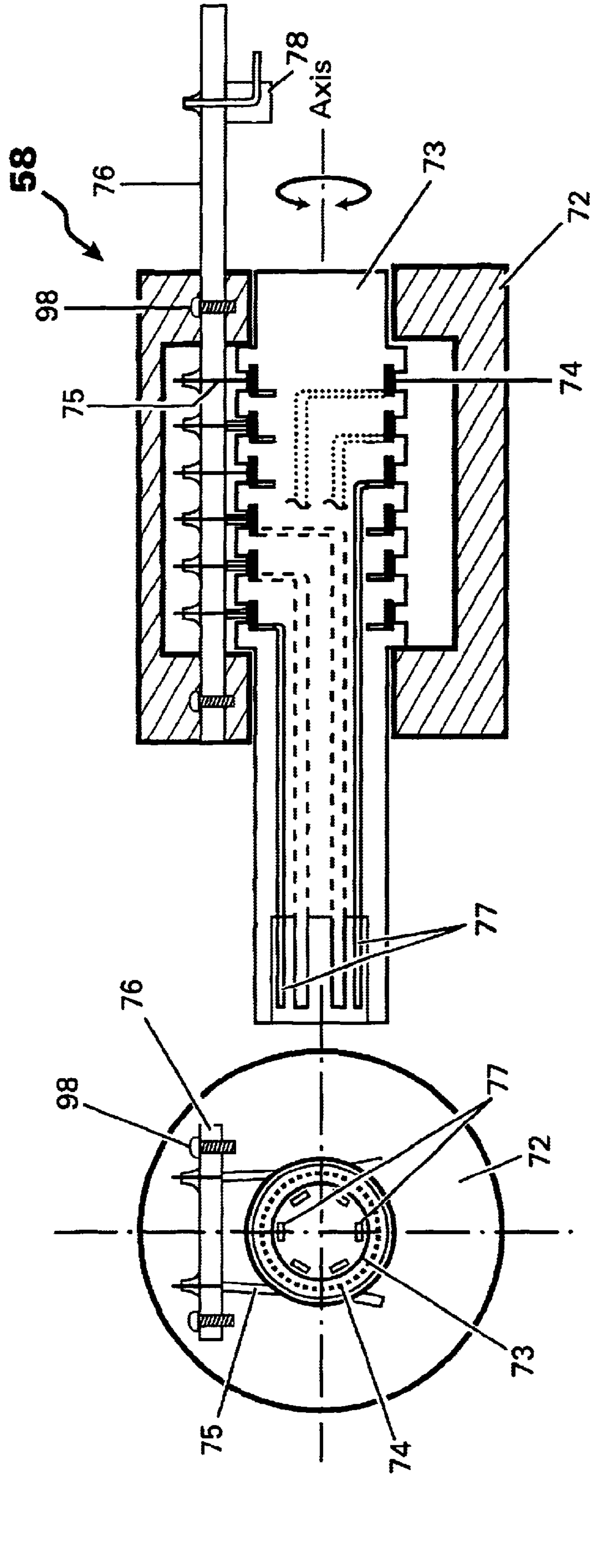
FIG. 7A is a top view of an example of a slip ring used in FIGS. 4–6.
FIG. 7B is an axial sectional view of the slip ring example used in FIGS. 4–6.

FIGS. 7A and 7B show details of the slip ring assembly of FIG. 4. The slip ring assembly 58 includes a slip ring body 72, a printed circuit board assembly 76 and a ring holder assembly 73. The ring holder assembly 73 has a plurality of conductive rings 74 all spaced and insulated from each other and all electrically connected via metal wires to form a connector 77 at one end of the slip ring assembly 58.

The ring holder assembly is constructed to fit into the slip ring body 72 and to be freely rotatable around the rotating axis of the longitudinal center of the slip ring body.

The printed circuit board assembly 76 comprises a plurality of conductive brushes 75 mounted and connected to a printed circuit board conductive pattern; the brushes 75 are positioned and spaced to compliment the conductive rings 74 for providing constant electrical contact by their brushing action against the conductive rings 74, and a connector 78 for providing electrical connections at the other end of the slip ring assembly 58. The printed circuit board assembly 76 which is secured to the slip ring body 72 by screws 98 can be directly connected to a wire harness instead of using the connector 78. Similarly, instead to forming connector 77 the conductive rings can be connected via a wire harness.

FIG. 7A illustrates conductive brushes 75 in contact with conductive rings 74. The use of brushes at both sides of the conductive rings improves continuity and reliability of the brushing action.

Other well known rotating contacts or slip ring assemblies can be used instead of the slip ring assembly shown in FIG. 7 and, regardless of the type of slip rings or other rotating electric coupling means used it is clearly seen that the apparatus of the present invention provides extremely simple means for directly driven positioning devices such as pan-tilt head of a television camera, robot arms or any other rotating joints by a motor incorporating rotating electric coupling means in its central shaft, without flexing or twisting the wires associated with both sides of the rotating joint.

It will, of course, be understood by those skilled in the art that the particular embodiment of the invention here presented is by way of illustration only, and is meant to be in no way restrictive, therefore, numerous changes and modifications may be made, and the full use of equivalents resorted to, without departing from the spirit or scope of the invention as outlined in the appended claims.

What is claimed is:

1. An electric motor apparatus comprising a stator body assembly for mounting an electric motor to one of a fixed member and a rotatable body of a rotatable joint, an inner rotor assembly including a central shaft, at least a portion of which is hollow, said shaft being adapted to be mounted to another one of said fixed member and said rotatable body of said rotatable joint, rotating electric coupling means mounted inside said hollow portion of said central shaft, first and second electrical wire means connected to said rotating electric coupling means, electric connector means coupled to said rotating electric coupling means and positioned at opposite ends of said central shaft for propagating at least one of electric power and electric signals carried by said first electrical wire means associated with one of said fixed member and said rotatable body to said second electrical wire means associated with another one of said rotatable body and said fixed member through said rotating electric coupling means without twisting or flexing electrical wires of said first and second electrical wire means while said rotatable body is being directly driven by said motor and is rotating.

2. Electric motor apparatus according to claim 1, wherein at least one of said first electrical wire means and said second electrical wire means are directly connected to said rotating electric coupling means without using said electric connector means.

3. Electric motor apparatus according to claim 2, wherein said stator body assembly is adapted for mounting said motor to said rotatable body of said rotatable joint and said inner rotor assembly is adapted to be mounted to said fixed member of said rotatable joint.

4. Electric motor apparatus according to claim 1, wherein said stator body assemblies is adapted for mounting said motor to said rotatable body of said rotatable joint and said inner rotor assembly is adapted to be mounted to said fixed member of said rotatable joint.

5. Electric motor apparatus according to claim 1, wherein said motor is a stepping motor.

6. An electric motor apparatus comprising a stator body assembly for mounting an electric motor to one of a first rotatable body and a second rotatable body of a rotatable joint, an inner rotor assembly including at least partially hollow central shaft adapted to be mounted to another one of said second rotatable body and said second rotatable body of said rotatable joint rotating electric coupling means mounted inside said hollow central shaft, first and second electrical wire means connected to said rotating electric coupling means, electric connector means coupled to said rotating electric coupling means and positioned at opposite ends of said central shaft for propagating at least one of electric power and electric signals carried by said first electrical wire means associated with one of said first and second rotatable body to said second electrical wire means associated with another one first and second rotatable body through said rotating electric coupling means without twisting or flexing electrical wires of said first and second electrical wire means while said rotatable body is being directly driven by said motor and is rotating.

7. Electric apparatus according to claim 6, wherein at least one of said first and second electrical wire means are directly connected to said rotating electric coupling means without using said electric connector means.

8. An electric motor apparatus comprising an outer rotor body assembly adapted for mounting an electric motor to one of a fixed member and a rotatable body of a rotatable joint; an inner stator assembly having a central shaft at least a portion of which is hollow, said central shaft being adapted to be mounted to another of said fixed member and said rotatable body of said rotatable joint, rotating electric coupling means mounted inside said hollow portion of said central shaft, first and second electrical wire means connected to said rotating electric coupling means, an electric connector means attached to said rotating electric coupling means and positioned at opposite ends of said central shaft for propagating electric signals carried by said first electrical wire means associated with one of said fixed member and said rotatable body to said second electrical wire means associated with another one of said fixed member and said rotatable body through said rotating electric coupling means without twisting or flexing electrical wires of said first and second electrical wire means while said rotatable body is being directly driven by said electric motor and is rotating.

9. Electric motor apparatus according to claim 8, wherein at least one of said first electrical wire means and said second electrical wire means are directly connected to said rotating electric coupling means without using said electric connector means.

10. Electric motor apparatus according to claim 9, wherein said outer rotor body assembly is adapted for mounting said motor to said rotatable body of said rotatable joint and said inner stator assembly is adapted to be mounted to said fixed member of said rotatable joint.

11. Electric motor apparatus according to claim 8, wherein said outer rotor body assembly is adapted for mounting said motor to said rotatable body of said rotatable joint and said inner stator assembly is adapted to be mounted to said fixed member of said rotatable joint.

12. Electric motor apparatus according to claim 8, wherein said motor is a stepping motor.

13. An electric motor apparatus comprising an outer rotor assembly adapted for mounting an electric motor to one of a first rotatable body and a second rotatable body of a rotatable joint; an inner stator assembly having a central shaft at least a portion of which is hollow, said central shaft being adapted to be mounted to another one of said first rotatable body and said second rotatable body of said rotatable joint, rotating electric coupling means mounted inside said hollow portion of said central shaft, first and second electrical wire means connected to said rotating electric coupling means, an electric connector means attached to said rotating electric coupling means and positioned at opposite ends of said central shaft for propagating electric signals carried by said first electrical wire means associated with one of said first and second rotatable body to said second electrical wire means associated with another one of said first and second rotatable body through said rotating electric coupling means without twisting or flexing electrical wires of said first and second electrical wire means while said rotatable body is being directly driven by said electric motor and is rotating.

14. Electric motor apparatus according to claim 13, wherein at least one of said first electrical wire means and said second electrical wire means are directly connected to said rotating electric coupling means without using said electric connector means.

15. An electric motor apparatus comprising a stator body assembly for mounting an electric motor to one of a fixed member and a rotatable body of a rotatable joint, an inner rotor assembly having a central shaft of which at least a portion is hollow, said shaft being adapted to be mounted to another one of said fixed member and said rotatable body of said rotatable joint; rotating electric coupling means comprising a rotating ring assembly coupled to one end of said central shaft and an electrical brush assembly coupled to said stator body assembly; first electric wire means connected to said rotating ring assembly and passing through said hollow portion of said central shaft to exit from an opposite end of said central shaft, second electrical wire means connected to said electrical brush assembly, wherein at least one of an electric power and electric signals are propagated through said first electrical wire means associated with said rotating ring assembly and said second electrical wire means associated with said electrical brush assembly through said rotating electric coupling means without twisting or flexing electrical wires of said first and second electrical wire means while said rotatable body is being directly driven by said motor and is rotating.

16. Electric motor apparatus according to claim 15, wherein said stator body assembly is adapted for mounting said motor to said rotatable body of said rotatable joint and said inner rotor is adapted to be mounted to said fixed member of said rotatable joint.

17. Electric motor apparatus according to claim 15, wherein said motor is a stepping motor.

18. An electric motor apparatus comprising a stator assembly for mounting an electric motor to one of a first rotatable body and a second rotatable body of a rotatable joint, an inner rotor assembly having a central shaft of which at least a portion is hollow, said central shaft being adapted to be mounted to another one of said first rotable body and said second rotatable body and said second rotatable body of said rotatable joint; rotating electric coupling means comprising a rotating ring assembly coupled to one end of said central shaft and an electrical brush assembly coupled to said stator body assembly; first electric wire means connected to said rotating ring assembly and passing through said hollow portion of said central shaft to exit from an opposite end of said central shaft, second electrical wire means connected to said electrical brush assembly, wherein at least one of electric power and electric signals are propagated through said first electrical wire means associated with said rotating ring assembly and said second electrical wire means associated with said electrical brush assembly through said rotating electric coupling means without twisting or flexing electrical wires of said first and second electrical wire means while said rotatable body is being directly driven by said motor and is rotating.

19. An electric motor apparatus comprising an outer rotor body assembly for mounting an electric motor to one of a fixed member and a rotatable body of a rotatable joint; an inner stator assembly having a hollow central shaft and adapted to be mounted to another one of said fixed member and said rotatable body of said rotatable joint, a rotating electric coupling means including a rotating ring assembly coupled to one end of said central shaft and an electrical brush assembly coupled to said outer rotor body assembly; first electric wire means connected to said rotating ring assembly and passing through said hollow central shaft to exit from an opposite end of said central shaft, second electrical wire means connected to said electrical brush assembly, wherein one of electric power and electric signals are propagated through said first electrical wire means associated with said rotating ring assembly and said second electrical wire means associated with said electrical brush assembly through said rotating electric coupling means without twisting or flexing electrical wires of said first and second electrical wire means while said rotatable body is being directly driven by said electric motor and is rotating.

20. Electric motor apparatus according to claim 19, wherein said outer rotor body assembly is adapted for mounting said motor to said rotatable body of said rotatable joint and said inner stator is adapted to be mounted to said fixed member of said rotatable joint.

21. Electric motor apparatus according to claim 19, wherein said motor is a stepping motor.

22. An electric motor apparatus comprising an outer rotor body assembly for mounting an electric motor to one of a first rotatable body and a second rotatable body of a rotatable joint; an inner stator assembly having a hollow central shaft adapted to be mounted to another one of said first rotatable body and said second rotatable body of said rotatable joint, rotating electric coupling means including a rotating ring assembly coupled to one end of said central shaft and an electrical brush assembly coupled to said outer rotor body assembly, first electric wire means connected to said rotating ring assembly and passing through said hollow central shaft to exit from an opposite end of said central shaft, second electrical wire means connected to said electrical brush assembly, wherein one of electric power and electric signals are propagated through said first electrical wire means associated with said rotating ring assembly and said second electrical wire means associated with said electrical brush assembly through said rotating electric coupling means without twisting or flexing electrical wires of said first and second electrical wire means while said rotatable body is being directly driven by said motor and is rotating.

23. A positioning device for panning and tilting a surveillance camera comprising a base plate for attaching said positioning device to a frame body means; an electric motor including an inner rotor assembly including a central shaft of which at least a portion is hollow, and a stator assembly which forms an outer body of said motor, said outer body of said motor being fixedly attached to said base plate so that said central shaft extends through a panning axis of said positioning device; a tilting motor; a camera holder bracket for carrying a camera along with at least one of a tilting motor and a tilting rotary joint, said bracket being fixedly attached to said central shaft so that a tilting movement or rotation about a tilting axis transverses said panning axis; said rotor assembly further including a rotating electric coupling means mounted inside said hollow portion of said central shaft, first and second electrical wire means connected to said rotating electric coupling means, an electric connector means coupled to said rotating electric coupling means positioned at opposite ends of said central shaft for propagating one of electric power and electric signals carried by said first electrical wire means associated with said base plate to said second electrical wire means associated with said camera holder bracket through said rotating electric coupling means without twisting or flexing electrical wires of said first and second electrical wire means while said camera holder bracket is being directly driven by said motor and is rotating about the panning axis.

24. Positioning device according to claim 23, wherein at least one of said first electrical wire means and second electrical wire means is directly connected to said rotating electric coupling means without using said electric connectors means.

25. Positioning device according to claim 24, wherein said tilting motor is fed with said one of electric power and electric signals by said second electrical wire means for operating said tilting movement or rotation.

26. Positioning device according to claim 25, wherein said tilting motor includes tilt inner motor assembly including tilt central shaft at least a portion of which is hollow and a stator assembly which forms an outer body of said tilting motor, said outer body at said tilting motor being fixedly attached to said camera holder bracket so that said tilt inner central shaft extends through said tilting axis of said positioning device; said tilt inner rotor assembly further including tilt rotating electric coupling means mounted inside said hollow portion of said tilt central shaft, third and fourth electrical wire means for connecting to said tilt rotating electric coupling means, tilt electric connector means attached to said tilt rotating electric coupling means positioned at the opposite ends of said hollow portion of said central shaft for propagating at least one of electric power and electric signals carried by said third electrical wire means associated with said second electrical wire means to said fourth electrical wire means associated with said camera holder bracket through said tilt rotating electric coupling means without twisting or flexing electrical wires of said second, third and fourth electrical wire means while said tilting motor is being rotating about said tilting axis for directly driving said tilting movement of said camera.

27. Positioning device according to claim 26, wherein said positioning device further comprises an at least partially transparent dome-shaped housing, wherein three axes consisting of said panning axis and said tilting axis and an axis of a lens of said camera affixed to said camera holder bracket intersect at an approximate geometrical center of said dome-shaped housing.

28. Positioning device according to claim 25, wherein said positioning device further comprises an at least partially transparent dome-shaped housing, wherein three axes consisting of said panning axis and said tilting axis and an axis of a lens of said camera affixed to said camera holder bracket intersect at an approximate geometrical center of said dome-shaped housing.

29. Positioning device according to claim 24, wherein said positioning device further comprises an at least partially transparent dome-shaped housing, wherein three axes consisting of said panning axis and said tilting axis and an axis of a lens of said camera affixed to said camera holder bracket intersect at an approximate geometrical center of said dome-shaped housing.

30. Positioning device according to claim 23, wherein said tilting motor is fed with said one of electric power and electric signals by said second electrical wire means for operating said tilting movement or rotation.

31. Positioning device according to claim 30, wherein said tilting motor includes tilt inner rotor assembly including tilt central shaft at least a portion of which is hollow and a stator assembly which forms an outer body of said tilting motor, said outer body of said tilting motor being fixedly attached to said camera holder bracket so that said tilt central shaft extends through said tilting axis of said positioning device; said tilt inner rotor assembly further including tilt rotating electric coupling means mounted inside said hollow portion of said tilt central shaft, third and fourth electrical wire means for connecting to said tilt rotating electric coupling means, tilt electric connector means attached to said tilt rotating electric coupling means positioned at the opposite ends of said hollow portion of said tilt central shaft for propagating at least one of electric power and electric signals carried by said third electrical wire means associated with said second electrical wire means to said forth electrical wire means associated with said camera holder bracket through said tilt rotating electric coupling means without twisting or flexing electrical wires of said second, third and fourth electrical wire means while said tilting motor is being rotating about said tilting axis for directly driving said tilting movement of a said camera.

32. Positioning device according to claim 31, wherein said positioning device further comprises an at least partially transparent dome-shaped housing, wherein three axes consisting of said panning axis and said tilting axis and an axis of a lens of said camera affixed to said camera holder bracket intersect at an approximate geometrical center of said dome-shaped housing.

33. Positioning device according to claim 30, wherein said positioning device further comprises an at least partially transparent dome-shaped housing, wherein three axes consisting of said panning axis and said tilting axis and an axis of a lens of said camera affixed to said camera holder bracket intersect at an approximate geometrical center of said dome-shaped housing.

34. Positioning device according to claim 23, wherein said positioning device further comprises an at least partially transparent dome-shaped housing, wherein three axes consisting of said panning axis and said tilting axis and an axis of a lens of said camera affixed to said camera holder bracket intersect at an approximate geometrical center of said dome-shaped housing.

35. Positioning device according to claim 23, wherein said frame body means is selected from the group consisting of a wall, a ceiling and a pole.

36. A positioning device for panning and tilting a surveillance camera comprising one of a base plate or a member for attaching said positioning device to a frame body means; an electric motor including an inner stator assembly including a hollow central shaft and an outer rotor assembly which forms outer body of said electric motor, said outer body of said electric motor being fixedly attached to one of said base plate and said member so that said central shaft extends through a panning axis of said positioning device; a tilting motor; a camera holder bracket for carrying a camera along with said tilting motor and a tilting rotary joint, said bracket being fixedly attached to said central shaft so that a tilting movement or rotation about a tilting axis transverses said panning axis; said stator assembly further including a rotating electric coupling means mounted inside said central shaft, first and second electrical wire means for connecting to said rotating electric coupling means, electric connector means attached to said rotating electric coupling means positioned at opposite ends of said hollow central shaft for propagating at least one of electric power and electric signals carried by said first electrical wire means associated with said base plate to said second electrical wire means associated with said camera holder bracket through said rotating electric coupling means without twisting or flexing electrical wires of said first and second electrical wire means while said camera holder bracket is being directly driven by said motor and is rotating about the panning axis.

37. Positioning device according to claim 36, wherein at least one of said first electrical wire means and said second electrical wire means is directly connected to said rotating electric coupling means without using said electric connector means.

38. A positioning device according to claim 37, wherein said tilting motor is fed with at least one of power and electric signals by said second electrical wire means for operating said tilting movement or rotation.

39. A positioning device according to claim 38, wherein said tilting motor includes tilt inner rotor assembly including at least partially hollow tilt central shaft and a stator assembly which forms an outer body of said tilting motor, said outer body of said tilting motor being fixedly attached to said camera holder bracket so that said tilt central shaft extends through said tilting axis of said positioning device; said tilt inner rotor assembly further including tilt rotating electric coupling means mounted inside said hollow portion of said tilt central shaft, third and fourth electrical wire means for connecting to said tilt rotating electric coupling means positioned at the opposite ends of said tilt central shaft for propagating at least one of electric power and electric signals carried by said third electrical wire means associated with said second electrical wire means to said fourth electrical wire means associated with said camera holder bracket through said rotating electric coupling means without twisting or flexing electrical wires of said second, third and fourth electrical wire means while said tilting motor is being rotating about said tilting axis for directly driving said tilting movement of said camera.

40. Positioning device according to claim 39, wherein said positioning device further comprises at least partially transparent dome-shaped housing, wherein three axes consisting of said panning axis and said tilting axis and an axis of a lens of said camera affixed to said camera holder bracket intersect at an approximate geometrical center of said dome-shaped housing.

41. Positioning device according to claim 38, wherein said positioning device further comprises at least partially transparent dome-shaped housing, wherein three axes consisting of said panning axis and said tilting axis and an axis of a lens of said camera affixed to said camera holder bracket intersect at an approximate geometrical center of said dome-shaped housing.

42. Positioning device according to claim 38, wherein said titling motor includes an inner stator assembly including a hollow central shaft and an outer rotor assembly which forms an outer body of said tilting motor and wherein rotating coupling means are mounted inside said hollow central shaft of said inner stator assembly.

43. Positioning device according to claim 37, wherein said positioning device further comprises at least partially transparent dome-shaped housing, wherein three axes consisting of said panning axis and said tilting axis and an axis of a lens of said camera affixed to said camera holder bracket intersect at an approximate geometrical center of said dome-shaped housing.

44. Positioning device according to claim 36, wherein said tilting motor is fed with at least one of power and electric signals by said second electrical wire means for operating said tilting movement or rotation.

45. Positioning device according to claim 44, wherein said tilting motor include tilt inner rotor assembly including tilt central shaft at least a portion of which is hollow and a stator assembly which forms an outer body of said tilting motor, said outer body of said tilting motor being fixedly attached to said camera holder bracket so that said tilt central shaft extends through the tilting axis of said positioning device; said tilt inner rotor assembly further including tilt rotating electric coupling means mounted inside said hollow portion of said tilt central shaft, third and fourth electrical wire means for connecting to said tilt rotating electric coupling means, tilt electric connector means attached to said tilt rotating electric coupling means positioned at the opposite ends of said tilt central shaft for propagating at least one of electric power and electric signals carried by said third electrical wire means associated with said second electrical wire means to said fourth electrical wire means associated with said camera holder bracket through said tilt rotating electric coupling means without twisting or flexing electrical wires of said second, third and fourth electrical wire means while said tilting motor is being rotating about said tilting axis for directly driving said tilting movement of said camera.

46. Positioning device according to claim 45, wherein said positioning device further comprises at least partially transparent dome-shaped housing, wherein three axes consisting of said panning axis and said tilting axis and an axis of a lens of said camera affixed to said camera holder bracket intersect at an approximate geometrical center of said dome-shaped housing.

47. Positioning device according to claim 44, wherein said positioning device further comprises at least partially transparent dome-shaped housing, wherein three axes consisting of said panning axis and said tilting axis and an axis of a lens of said camera affixed to said camera holder bracket intersect at an approximate geometrical center of said dome-shaped housing.

48. Positioning device according to claim 44, wherein said titling motor includes an inner stator assembly including a hollow central shaft and an outer rotor assembly which forms an outer body of said tilting motor and wherein rotating coupling means are mounted inside said hollow central shaft of said inner stator assembly.

49. Positioning device according to claim 36, wherein said positioning device further comprises at least partially transparent dome-shaped housing, wherein three axes consisting of said panning axis and said tilting axis and an axis of a lens of said camera affixed to said camera holder bracket intersect at an approximate geometrical center of said dome-shaped housing.

50. Positioning device according to claim 36, wherein said frame body means is selected from the group consisting of a wall, a ceiling and a pole.

* * * * *